United States Patent
Kinoshita et al.

(10) Patent No.: US 9,082,562 B2
(45) Date of Patent: Jul. 14, 2015

(54) INRUSH-CURRENT SUPPRESSING DEVICE AND INRUSH-CURRENT SUPPRESSING METHOD

(75) Inventors: Sadayuki Kinoshita, Tokyo (JP); Kenji Kamei, Tokyo (JP); Tomohito Mori, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 559 days.

(21) Appl. No.: 13/509,806

(22) PCT Filed: Jan. 13, 2010

(86) PCT No.: PCT/JP2010/050282
§ 371 (c)(1),
(2), (4) Date: May 15, 2012

(87) PCT Pub. No.: WO2011/086671
PCT Pub. Date: Jul. 21, 2011

(65) Prior Publication Data
US 2012/0236443 A1 Sep. 20, 2012

(51) Int. Cl.
H01H 9/56 (2006.01)
H02H 7/04 (2006.01)
H02H 9/00 (2006.01)

(52) U.S. Cl.
CPC ............... *H01H 9/563* (2013.01); *H02H 7/04* (2013.01); *H02H 9/002* (2013.01)

(58) Field of Classification Search
CPC ......... H01H 33/59; H01H 9/002; H02H 7/04; H02H 9/002
See application file for complete search history.

(56) References Cited

U.S. PATENT DOCUMENTS 7,259,947 B2 * 8/2007 Kinoshita et al. ............... 361/85
7,787,228 B2 * 8/2010 Koyama et al. ................. 361/78
(Continued)

FOREIGN PATENT DOCUMENTS

EP 2 141 780 A1 1/2010
JP 2004-208394 A 7/2004
(Continued)

OTHER PUBLICATIONS

International Search Report (PCT/ISA/210) issued on Mar. 9, 2010, by the Japanese Patent Office as the International Searching Authority for International Application No. PCT/JP2010/050282.
(Continued)

*Primary Examiner* — Zeev V Kitov
(74) *Attorney, Agent, or Firm* — Buchanan Ingersoll & Rooney PC

(57) ABSTRACT

An inrush-current suppressing device includes: a residual-magnetic-flux calculating unit that calculates a residual magnetic flux in a reference phase of a three-phase transformer while assuming a maximum magnetic flux level generated at a time of applying a rated voltage as 1 PU based on a measurement result of a transformer-voltage measuring unit before and after opening a three-phase circuit breaker; a stationary-magnetic-flux calculating unit that calculates a stationary magnetic flux in the reference phase of the three-phase transformer with reference to the maximum magnetic flux level obtained as the 1 PU based on a measurement result of a power-supply-voltage measuring unit, in response to a closing command to the three-phase circuit breaker; and a control unit that actuates a switch of the three-phase circuit breaker corresponding to the reference phase at a timing when the stationary magnetic flux and the residual magnetic flux in the reference phase match each other.

6 Claims, 6 Drawing Sheets

(56) References Cited

U.S. PATENT DOCUMENTS

| | | |
|---|---|---|
| 2008/0164962 A1 | 7/2008 | Koyama et al. |
| 2010/0013470 A1* | 1/2010 | Tsutada et al. .............. 324/244 |
| 2010/0187916 A1* | 7/2010 | Saito ........................... 307/140 |

FOREIGN PATENT DOCUMENTS

| | | |
|---|---|---|
| JP | 2005-204368 A | 7/2005 |
| JP | 2006-040566 A | 2/2006 |
| JP | 2008-135246 A | 6/2008 |
| JP | 2008-140580 A | 6/2008 |
| WO | WO 2007/088588 A1 | 8/2007 |
| WO | WO 2008/136071 A1 | 11/2008 |

OTHER PUBLICATIONS

Written Opinion (PCT/ISA/237) issued on Mar. 9, 2010, by the Japanese Patent Office as the International Searching Authority for International Application No. PCT/JP2010/050282.

* cited by examiner

INRUSH-CURRENT SUPPRESSING DEVICE AND INRUSH-CURRENT SUPPRESSING METHOD

FIELD

The present invention relates to an inrush-current suppressing device and an inrush-current suppressing method for suppressing a transient magnetizing inrush current in a transformer connected to an electric system via a power switchgear.

BACKGROUND

It is important to perform a timing control of a power switchgear when supplying a current to a transformer so as to suppress a transient magnetizing inrush current in the transformer. For example, Patent Literature 1 mentioned below discloses the following technique. Residual magnetic fluxes in respective phases of a three-phase transformer are detected, and an alternating-current (AC) voltage in a reference phase is applied at a timing when a stationary magnetic flux and the residual magnetic flux in the reference phase match each other. Thereafter, AC voltages in the two remaining phases are applied at a timing when the AC voltage in the reference phase becomes zero, thereby suppressing a magnetizing inrush current.

CITATION LIST

Patent Literature

Patent Literature 1: Japanese Patent Application Laid-open No. 2006-040566 (First embodiment, FIG. 4, paragraph [0017] and the like)

SUMMARY

Technical Problem

With the conventional magnetizing inrush-current suppressing method disclosed in Patent Literature 1 mentioned above, a targeted closing phase corresponding to a residual magnetic flux is determined in view of pre-arc characteristics of a three-phase circuit breaker so as to apply an AC voltage in the reference phase at the timing when the stationary magnetic flux and the residual magnetic flux in the reference phase match each other. In addition, while amplitudes of the three-phase transformer magnetic fluxes at a time of applying a rated voltage are normalized to a rated value of 1 PU (Per Unit) and the maximum amplitude of power supply-side voltages is set 1 PU, the stationary magnetic fluxes are calculated while assuming the maximum amplitude of the stationary magnetic flux delayed in a phase from the power supply-side voltage by 90 degrees as 1 PU.

However, this method has the following problems. The influence of the magnitude of AC voltages at a time of opening the circuit breaker or at a time of applying the voltages is not considered. Therefore, even when the timing of closing the circuit breaker is controlled so as to apply the AC voltage at the timing when the stationary magnetic flux and the residual magnetic flux in the reference phase match each other, it is often impossible to suppress the magnetizing inrush current. This is because when the circuit breaker is opened or when the AC voltages at the time of applying the voltages differ in the magnitude from the rated voltage, the application timing changes at a moment when a pre-arc is generated.

The present invention has been achieved in view of the above problems, and an object of the present invention is to provide an inrush-current suppressing device and an inrush-current suppressing method capable of suppressing a magnetizing inrush current even when the magnitude of alternating-current voltages changes at a time of opening a circuit breaker or at a time of applying the voltages.

Solution to Problem

In order to solve the above problem and in order to attain the above object, in an inrush-current suppressing device, applied to a configuration of supplying and shutting off a three-phase alternating-current power supply to and from a three-phase transformer via a three-phase circuit breaker, for suppressing a magnetizing inrush current possibly generated in the three-phase transformer during actuation of the three-phase circuit breaker, the device of the present invention, includes: a residual-magnetic-flux calculating unit that calculates a residual magnetic flux in a reference phase of the three-phase transformer while assuming a maximum magnetic flux level generated at a time of applying a rated voltage as 1 PU based on voltages applied to the three-phase transformer before and after opening the three-phase circuit breaker; a stationary-magnetic-flux calculating unit that calculates a stationary magnetic flux in the reference phase of the three-phase transformer with reference to the maximum magnetic flux level obtained as the 1 PU based on voltages applied by the three-phase alternating-current power supply to the three-phase circuit breaker, in response to a closing command to the three-phase circuit breaker; and a control unit that actuates a switch of the three-phase circuit breaker corresponding to the reference phase at a timing when the stationary magnetic flux in the reference phase calculated by the stationary-magnetic-flux calculating unit matches the residual magnetic flux in the reference phase calculated by the residual-magnetic-flux calculating unit, in response to the closing command.

Advantageous Effects of Invention

According to the inrush-current suppressing device of the present invention, it is possible to suppress a magnetizing inrush current even when the magnitude of alternating-current voltages changes at a time of opening a circuit breaker or at a time of applying the voltages.

DESCRIPTION OF EMBODIMENTS

Exemplary embodiments of an inrush-current suppressing device and an inrush-current suppressing method according to the present invention will be explained below in detail with reference to the accompanying drawings. The present invention is not limited to the embodiments.

First Embodiment

Figure 1:
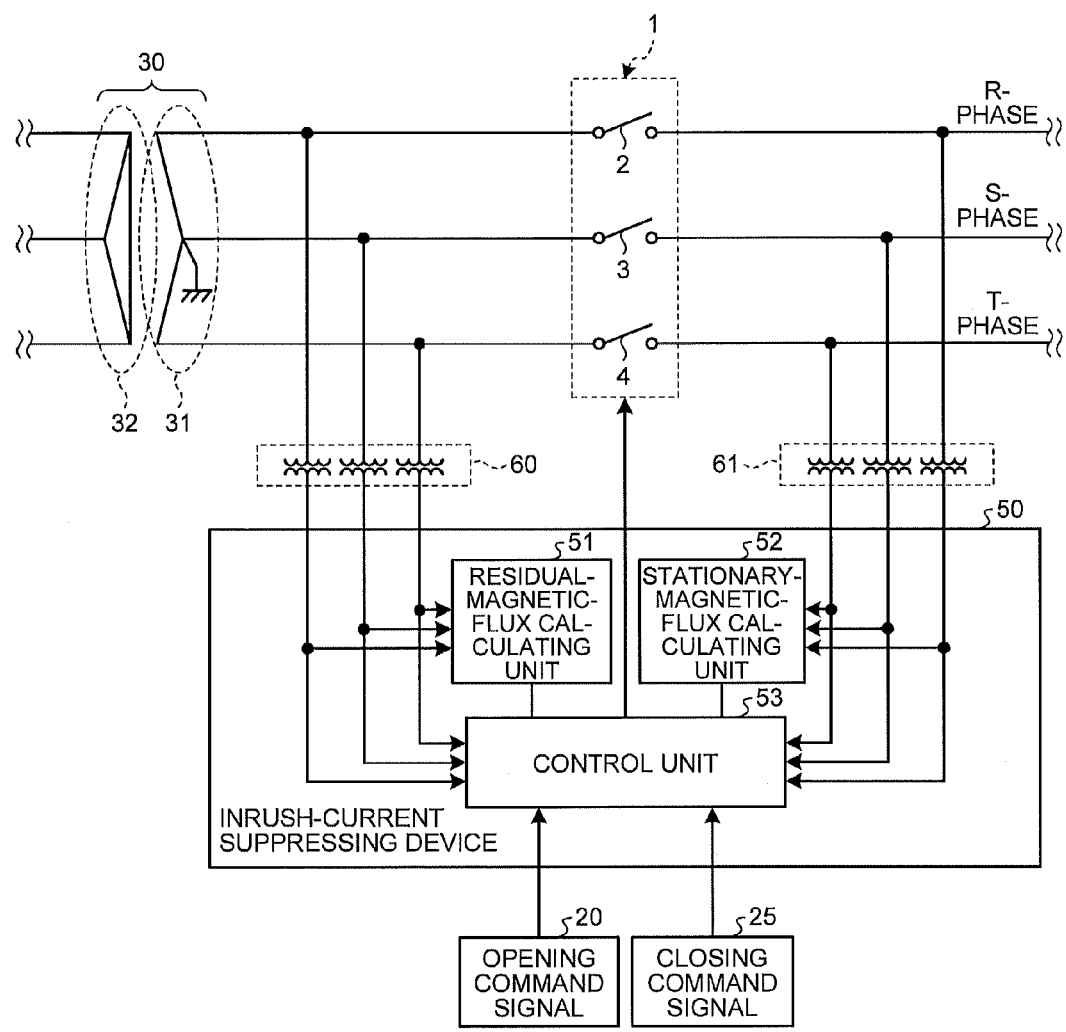
FIG. 1 depicts a configuration of an inrush-current suppressing device according to a first embodiment.

FIG. 1 depicts a configuration of an inrush-current suppressing device 50 according to a first embodiment. As shown in FIG. 1, the inrush-current suppressing device 50 according to the first embodiment includes a residual-magnetic-flux calculating unit 51, a stationary-magnetic-flux calculating unit 52, a control unit 53, and a transformer-voltage measuring unit 60 and a power-supply-voltage measuring unit 61 each including a voltage measuring function. The transformer-voltage measuring unit 60 and the power-supply-voltage measuring unit 61 are configured to monitor voltages (in an R-phase, an S-phase, and a T-phase) of a power system line. The residual-magnetic-flux calculating unit 51, the stationary-magnetic-flux calculating unit 52, and the control unit 53 can be constituted by, for example, a computer including units such as a control processor, a memory, and an input/output device. On the power system line (in the R-phase, the S-phase, and the T-phase), a three-phase circuit breaker 1 and a three-phase transformer 30 are provided, and AC power is supplied to the three-phase transformer 30 from a three-phase AC power supply (not shown) via the three-phase circuit breaker 1.

The three-phase circuit breaker 1 shuts off the supply of power during maintenance and inspection or during occurrence of an accident, and includes three switches 2 to 4 that are independently controllable. AC voltages in the R-phase, the S-phase, and the T-phase are applied to one-side terminals of the switches 2 to 4 from a three-phase AC power supply (not shown), respectively. In a normal operation, the switches 2 to 4 are closed to enable the supply of power; however, at the time of controlling in maintenance and inspection or due to occurrence of an accident, the switches 2 to 4 are opened to shut off the supply of power.

The three-phase transformer 30 is a three-phase transformer connected by Y-Δ connections. Specifically, the three-phase transformer 30 includes a three-phase primary winding 31 that is star-connected and has a grounded neutral point and a three-phase secondary winding 32 that is delta-connected. Three input terminals of the three-phase primary winding 31 are connected to other-side terminals of the switches 2 to 4, respectively. Three output terminals of the three-phase secondary winding 32 are connected to loads (not shown), respectively. When the three-phase circuit breaker 1 is closed, stationary magnetic fluxes are generated in phases of the three-phase transformer 30, respectively. When the three-phase circuit breaker 1 is open, residual magnetic fluxes are generated in the phases of the three-phase transformer 30, respectively.

Functions of respective units constituting the inrush-current suppressing device 50 according to the first embodiment are described next With reference to FIG. 1.

The transformer-voltage measuring unit 60 continuously measures voltage instantaneous values on the other-side terminals of the switches 2 to 4, that is, on the three input terminals of the three-phase primary winding 31 of the three-phase transformer 30. These values measured by the transformer-voltage measuring unit 60 are supplied to the residual-magnetic-flux calculating unit 51 and the control unit 53.

The residual-magnetic-flux calculating unit 51 integrates the values measured by the transformer-voltage measuring unit 60 before and after the opening of the three-phase circuit breaker 1. In addition, the residual-magnetic-flux calculating unit 51 calculates a residual magnetic flux in a reference phase of the three-phase transformer 30 while assuming a maximum magnetic flux level generated at a time of applying a rated voltage as 1 PU (Per Unit), and notifies the control unit 53 of the calculated residual magnetic flux.

The power-supply-voltage measuring unit 61 continuously measures voltage instantaneous values on the one-side terminals of the switches 2 to 4, that is, in the R-phase, the S-phase, and the T-phase of the three-phase AC power supply. These values measured by the power-supply-voltage measuring unit 61 are supplied to the stationary-magnetic-flux calculating unit 52 and the control unit 53.

The stationary-magnetic-flux calculating unit 52 integrates the values measured by the power-supply-voltage measuring unit 61 in response to a closing command signal 25. In addition, the stationary-magnetic-flux calculating unit 52 calculates a stationary magnetic flux in the reference phase while assuming the maximum magnetic flux level generated at the time of applying the rated voltage as 1 PU, and notifies the control unit 53 of the calculated stationary magnetic flux.

When an opening command signal 20 is input to the control unit 53, the control unit 53 simultaneously opens the three switches 2 to 4 at a zero point where an AC voltage in the reference phase (assumed as the R-phase in the first embodiment) among the three phases changes from a negative side to a positive side. The control unit 53 can thereby control a direct-current (DC) component of the residual magnetic flux in the R-phase of the three-phase transformer 30 to a negative predetermined value, for example, "−K" (where K is a positive real number), and can control DC components of the residual magnetic fluxes in the S-phase and the T-phase to a value about −½ as great as the residual magnetic flux in the reference phase (the R-phase) (that is, K/2).

When the closing command signal 25 is input to the control unit 53, the control unit 53 actuates the switch 2 corresponding to the R-phase (the reference phase) at a timing when the residual magnetic flux calculated by the residual-magnetic-flux calculating unit 51 and the stationary magnetic flux calculated by the stationary-magnetic-flux calculating unit 52 in the R-phase match each other. As for the S-phase and the T-phase, the control unit 53 actuates the two remaining switches 3 and 4 at a timing when the AC voltage in the R-phase becomes zero after actuating the switch 2 corresponding to the R-phase.

The control unit 53 calculates a timing of zero points, residual magnetic fluxes, stationary magnetic fluxes, a timing when the stationary magnetic fluxes match the residual magnetic fluxes in the respective phases, and the like.

In the above explanations, "to close the switches 2 to 4" means to mechanically contact contacts of the switches 2 to 4 to one another. It is necessary to have a predetermined closing time since the control unit 53 outputs a closing command to each of the switches 2 to 4 until the switches 2 to 4 are actually closed.

Furthermore, "to actuate the switches 2 to 4" means to supply a current caused by a pre-arc (a phenomenon in which a current starts flowing between contacts before the switches 2 to 4 are closed) to the switches 2 to 4. It is necessary to have a predetermined actuation time since the control unit 53 outputs the closing command to each of the switches 2 to 4 until the switches 2 to 4 are actually actuated.

Further, it is necessary to have a predetermined opening time since the control unit 53 outputs an opening command to each of the switches 2 to 4 until the switches 2 to 4 are actually opened. The control unit 53 controls the switches 2 to 4 at the timing described above in view of the closing time, the actuation time, and the opening time.

Figure 2:
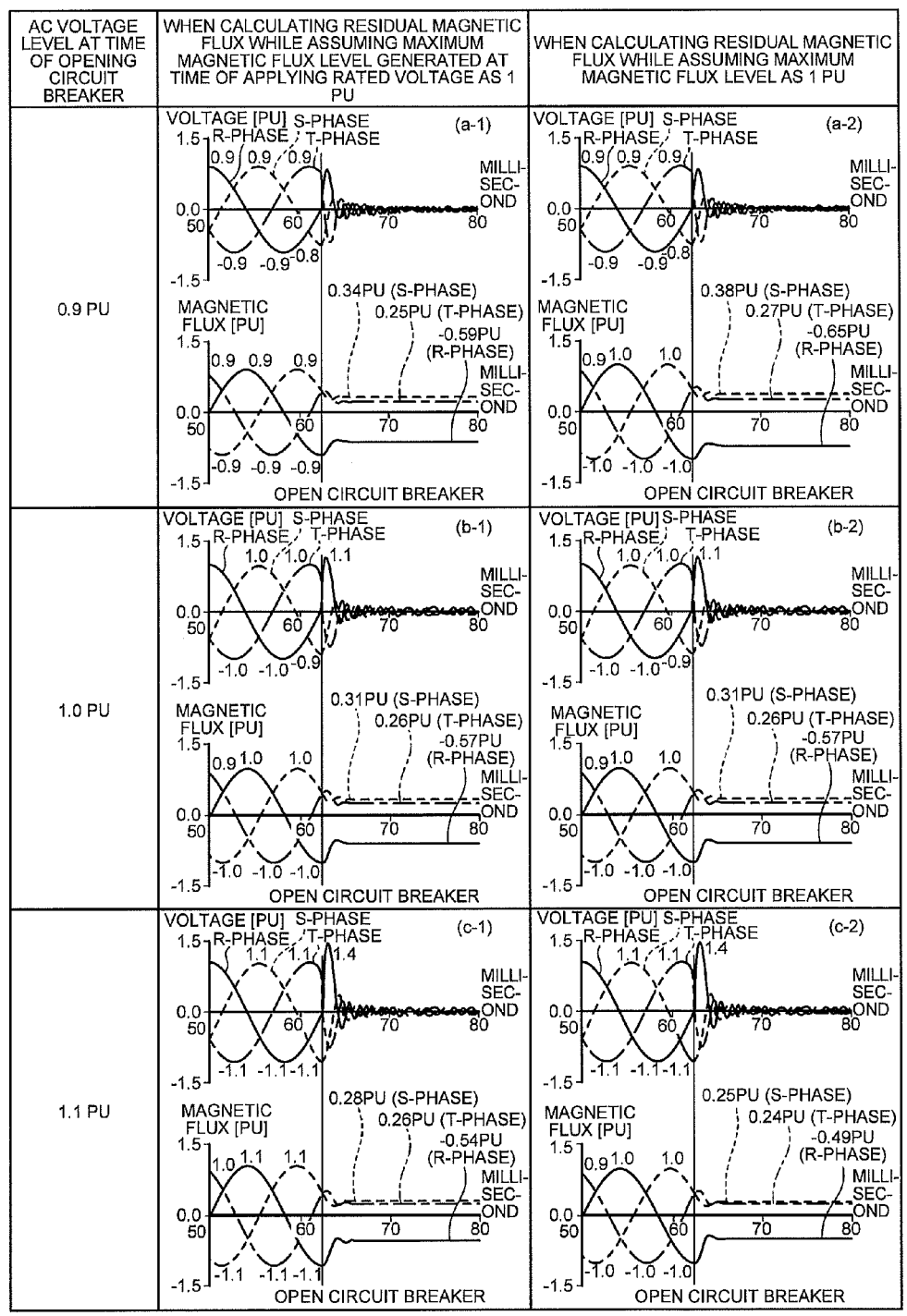
FIG. 2 are explanatory diagrams of a method by which the inrush-current suppressing device according to the first embodiment deduces residual magnetic fluxes.

Next, a method by which the inrush-current suppressing device 50 according to the first embodiment deduces the residual magnetic fluxes is described with reference to FIGS. 1 and 2. FIG. 2 are explanatory diagrams of the method by which the inrush-current suppressing device 50 according to the first embodiment deduces the residual magnetic fluxes. FIG. 2 depict voltage behaviors and magnetic flux behaviors in the respective phases at the time of opening the circuit breaker in comparison to a conventional method.

FIGS. 2(a-1), 2(b-1), and 2(c-1) depict waveforms when changing an AC voltage level at the time of opening the three-phase circuit breaker 1 to 0.9 PU, 1.0 PU, and 1.1 PU, respectively. More specifically, an upper waveform in each of FIGS. 2(a-1), 2(b-1), and 2(c-1) is a waveform obtained when the transformer-voltage measuring unit 60 continuously measures the voltage instantaneous values on the other-side terminals of the switches 2 to 4 (that is, the three input terminals of the three-phase primary winding 31 of the three-phase transformer 30). A lower waveform therein is a waveform of each of the residual magnetic fluxes of the three-phase transformer 30 obtained (normalized) by the method according to the first embodiment by which the residual-magnetic-flux calculating unit 51 integrates the values measured by the transformer-voltage measuring unit 60 before and after the three-phase circuit breaker 1 is opened while assuming the maximum magnetic flux level generated at the time of applying the rated voltage as 1.0 PU.

Meanwhile, FIGS. 2(a-2), 2(b-2), and 2(c-2) depict waveforms, similarly to FIGS. 2(a-1), 2(b-1), and 2(c-1), when changing the AC voltage level at the time of opening the three-phase circuit breaker 1 to 0.9 PU, 1.0 PU, and 1.1 PU, respectively. In this case, an upper waveform in each of FIGS. 2(a-2), 2(b-2), and 2(c-2) is obtained when the transformer-voltage measuring unit 60 continuously measures the voltage instantaneous values on the other-side terminals of the switches 2 to 4 (that is, the three input terminals of the three-phase primary winding 31 of the three-phase transformer 30), similarly to FIGS. 2(a-2), 2(b-2), and 2(c-2), respectively. However, a lower waveform therein is a waveform obtained (normalized) when the residual-magnetic-flux calculating unit 51 integrates the values measured by the transformer-voltage measuring unit 60 before and after the three-phase circuit breaker 1 is opened while assuming a maximum value of amplitudes of the three-phase transformer magnetic fluxes as 1.0 PU.

As FIGS. 2(a-1), 2(b-1), and 2(c-1) are compared with FIGS. 2(a-2), 2(b-2), and 2(c-2), respectively, when the AC voltage level at the time of opening the three-phase circuit breaker 1 is 1.0 PU, the same residual magnetic fluxes are obtained (see FIGS. 2(b-1) and 2(b-2).) However, when the AC voltage level at the time of opening the circuit breaker 1 changes to 0.9 PU or 1.1 PU, errors up to 0.05 PU are generated between the residual magnetic fluxes as is clear from the comparison between the lower waveforms in FIGS. 2(a-1) and 2(a-2) and between those in FIGS. 2(c-1) and 2(c-2). These differences in the residual magnetic flux cause changes in the timing of actuating the circuit breaker and influence the magnitude of a magnetizing inrush current generated at the time of actuating the circuit breaker. That is, the conventional method has a problem such that, even when the timing of closing the circuit breaker is controlled to apply the AC voltage at the timing when the stationary magnetic flux and the residual magnetic flux in the reference phase match each other, the magnetizing inrush current at the time of actuating the circuit breaker cannot be suppressed.

Figure 3:
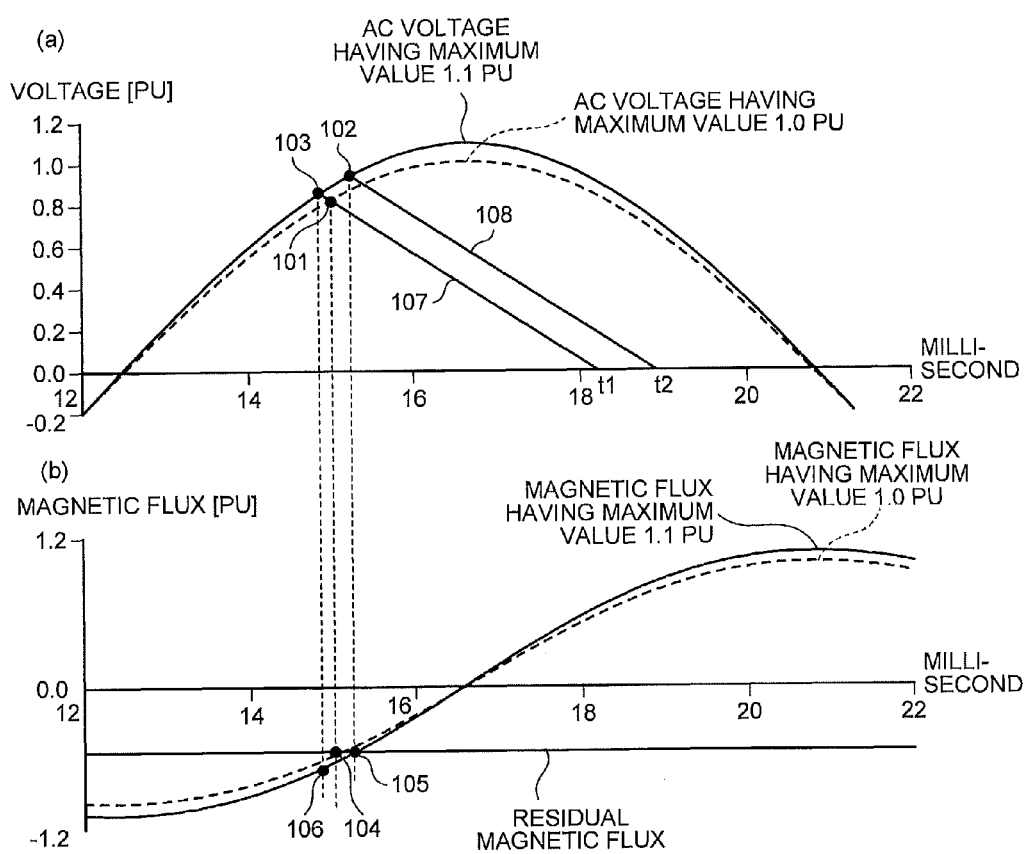
FIG. 3 are time charts for explaining an inrush-current suppressing method by actuating a switch corresponding to a reference phase (an R-phase).

FIG. 3 are time charts for explaining an inrush-current suppressing method by actuating the switch corresponding to the reference phase (the R-phase). Specifically, a curve indicated by a dotted line in FIG. 3(a) is an AC voltage waveform when a maximum value of the AC voltage applied to the R-phase is 1.0 PU, and a curve indicated by a solid line is an AC voltage waveform when the maximum value of the AC voltage applied to the R-phase is 1.1 PU. Furthermore, a curve indicated by a dotted line in FIG. 3(b) is a stationary magnetic flux waveform when the maximum value of the AC voltage applied to the R-phase is 1.0 PU, and a curve indicated by a solid line in FIG. 3(b) is a stationary magnetic flux waveform when the maximum value of the AC voltage applied to the R-phase is 1.1 PU. While FIG. 3(b) also depicts a residual magnetic flux waveform, the magnetic flux is shown to have a constant value to facilitate the explanation.

FIG. 3(a) also depicts an RDDS (Rate of Decay of Dielectric Strength) curve 107 passing through a point 101 when the maximum value of the AC voltage is 1.0 PU, and an RDDS curve 108 passing through a point 102 when the maximum value of the AC voltage is 1.1 PU. The RDDS curves 107 and 108 are equal in a gradient. In FIG. 3(a), a time t1 or a time t2, at which the RDDS curve 107 or 108 intersects a time axis, indicates a time when the switch 2 is mechanically closed. In other words, when the control unit 53 outputs the command to close the switch 2 at a time before the time t1 or t2 by as much as a period for closing the switch 2, a pre-arc is generated at the point 101 or the point 102, and then the control unit 53 actuates the switch 2 at a point 104 or a point 105 where the stationary magnetic flux matches the residual magnetic flux.

However, when the control unit 53 outputs the closing command obtained while assuming the maximum amplitude of the power supply-side AC voltage as 1.0 PU and the maximum amplitude of the stationary magnetic flux delayed by 90 degrees in the phase from the power supply-side voltage as 1.0 PU to the switch 2 as described in the conventional method despite the maximum value of the AC voltage is 1.1 PU, the switch 2 is actuated at a point 103. When a point where the switch 2 is actuated is the point 103, the stationary magnetic flux does not match the residual magnetic flux because the stationary magnetic flux in the R-phase is located at a point 106. As a result, a magnetizing inrush current in proportion to a difference between the magnetic fluxes flows.

Meanwhile, as described in the first embodiment, when the control unit 53 outputs the closing command obtained by normalizing the maximum amplitude of the power-supply-side AC voltage and the maximum amplitude of the stationary magnetic flux in proportion to the maximum value of the AC voltage so that the maximum magnetic flux level generated at the time of applying the rated voltage becomes equal to 1.0 PU to the switch 2, it is possible to control the magnetic fluxes at an optimum actuation point.

For example, when the maximum value of the AC voltage is 1.1 PU, the control unit 53 outputs the closing command to the switch 2 to close the switch 2 at the time t2 so that the stationary magnetic flux for the maximum value 1.1 PU of the AC voltage generated when the maximum value of the AC voltage in the reference phase (the R-phase) is 1.1 PU can match the previously-calculated residual magnetic flux, and actuates the switch 2 at the point 102 shown in FIG. 3(a). At this time, on the magnetic flux curve shown in FIG. 3(b), the point 105 where the stationary magnetic flux matches the residual magnetic flux corresponds to the actuation point.

When the maximum value of the AC voltage is 1.0 PU, the control unit 53 outputs the closing command to the switch 2 to close the switch 2 at the time t1 so that the stationary magnetic flux for the maximum value 1.0 PU of the AC voltage generated when the maximum value of the AC voltage in the reference phase (the R-phase) is 1.0 PU can match the previously-calculated residual magnetic flux. Therefore, needless to mention, the point 104 where the stationary magnetic flux matches the residual magnetic flux corresponds to the actuation point.

Figure 4:
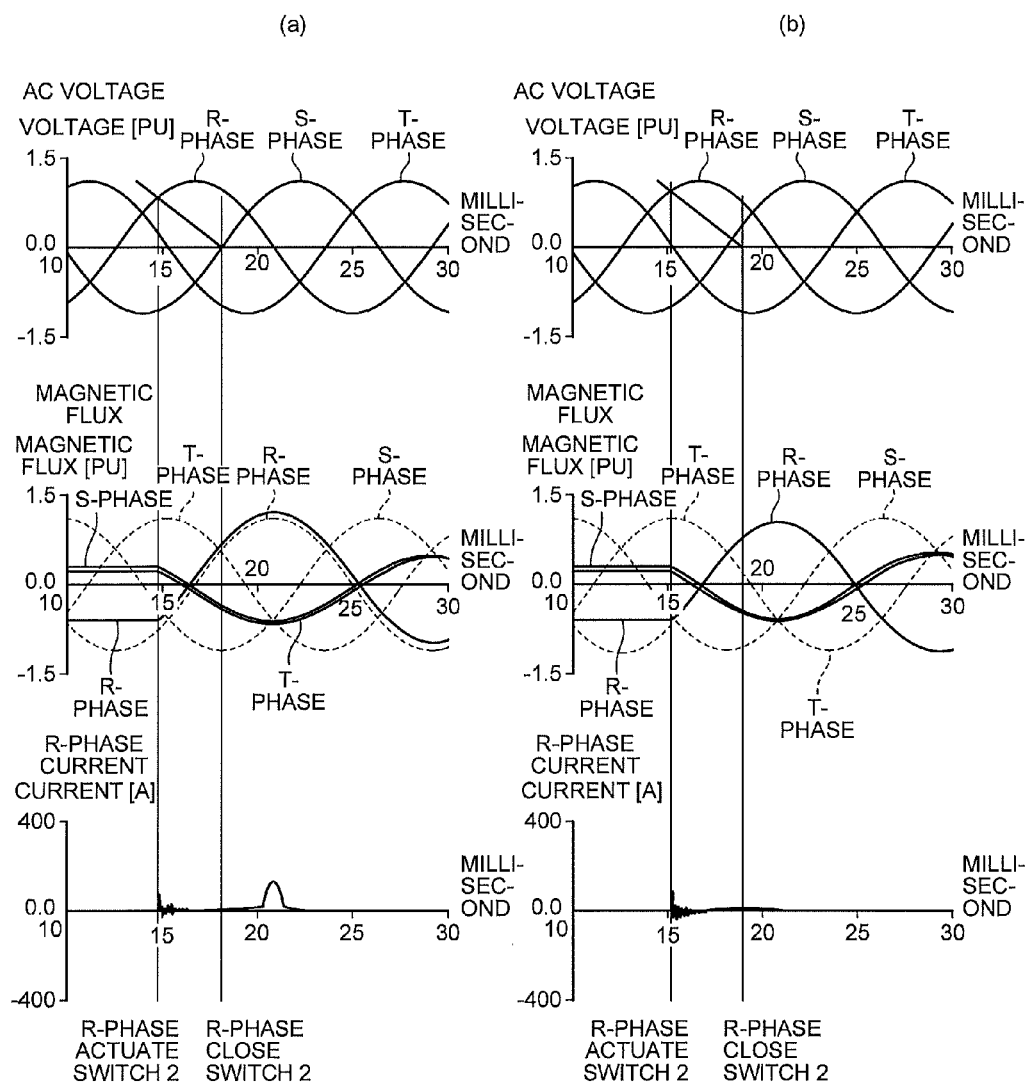
FIG. 4 depict voltage behaviors, magnetic flux behaviors, and magnetizing inrush currents, for explaining an inrush-current suppressing effect in the reference phase (the R-phase).

FIG. 4 depict voltage behaviors, magnetic flux behaviors, and magnetizing inrush currents, for explaining an inrush-current suppressing effect in the reference phase (the R-phase). More specifically, FIG. 4(a) depicts AC voltage waveforms, magnetic flux waveforms, and a current waveform in the reference phase (the R-phase) when the control unit 53 outputs the closing command to actuate the switch 2 at the timing when the stationary magnetic flux and the residual magnetic flux in the reference phase match each other while assuming the maximum amplitude of the stationary magnetic flux as 1.0 PU despite the maximum value of the AC voltage in the reference phase (the R-phase) is 1.1 PU. FIG. 4(b) depicts AC voltage waveforms, magnetic flux waveforms, and a current waveform in the reference phase (the R-phase) when the stationary magnetic flux in the reference phase (the R-phase) is calculated while assuming the maximum magnetic flux level generated at the time of applying the rated voltage as 1.0 PU, and when the control unit 53 outputs the closing command to actuate the switch 2 at the timing when the stationary magnetic flux for the maximum value 1.1 PU of the AC voltage generated when the maximum value of the AC voltage in the reference phase is 1.1 PU matches the previously-calculated residual magnetic flux. In both FIGS. 4(a) and 4(b), as for the magnetic flux waveforms, the residual magnetic fluxes in the respective phases shown in FIG. 2(b-1) are indicated by a solid line, and the stationary magnetic fluxes in the phases calculated by temporally differentiating the AC voltage waveforms in the three phases are indicated by a dotted line, respectively.

In FIG. 4(a), when the control unit 53 outputs the closing command obtained while assuming the maximum amplitude of the stationary magnetic fluxes as 1.0 PU to the switch 2 despite the maximum value of the AC voltage in the reference phase (the R-phase) is 1.1 PU, the switch 2 is actuated at a time matching the point 103 shown in FIG. 3(a). In this case, the stationary magnetic flux and the residual magnetic flux in the reference phase (the R-phase) at the actuation point do not match each other, the residual magnetic flux waveform (indicated by the solid line) is shifted to an upper side of the stationary magnetic flux (indicated by the dotted line), and the magnetic flux causes a transient phenomenon. As a result, an R-phase current flows as shown in a bottom part of FIG. 4(a) and it is impossible to suppress occurrence of the magnetizing inrush current.

On the other hand, in FIG. 4(b), when the control unit 53 outputs the closing command for actuating the switch 2 at the timing when the stationary magnetic flux for the maximum value 1.1 PU generated when the maximum value of the AC voltage in the R-phase is 1.1 PU matches the residual magnetic flux calculated with the maximum value of the AC voltage assumed as 1.1 PU after calculating the stationary magnetic flux in the reference phase (the R-phase) while assuming the maximum magnetic flux level generated at the time of applying the rated voltage as 1.0 PU, the switch 2 is actuated at a time matching the point 102 shown in FIG. 3(a).

Therefore, the stationary magnetic flux and the residual magnetic flux in the reference phase (the R phase) can match each other, and it is possible to suppress occurrence of the magnetizing inrush current.

In this way, the inrush-current suppressing device 50 according to the first embodiment can control the stationary magnetic flux and the residual magnetic flux in the reference phase (the R-phase) to match each other without being influenced by the magnitude of the maximum value of the AC voltage. Therefore, it is possible to control the magnetizing inrush current even when the circuit breaker is opened or the magnitude of the AC voltage at the time of applying the voltage changes.

As described above, the inrush-current suppressing device 50 according to the first embodiment performs a control to calculate the residual magnetic flux in the reference phase of the three-phase transformer 30 based on a measurement result of the transformer-voltage measuring unit 60 before and after opening the three-phase circuit breaker while assuming the maximum magnetic flux level generated at the time of applying the rated voltage as 1 PU, to calculate the stationary magnetic flux in the reference phase of the three-phase transformer 30 based on a measurement result of the power-supply-voltage measuring unit 61 in response to the closing command to the three-phase circuit breaker with reference to the maximum magnetic flux level obtained as 1 PU, and to actuate the switch corresponding to the reference phase of the three-phase circuit breaker 1 at the timing when the stationary magnetic flux and the residual magnetic flux in the reference phase match each other in response to the closing command. Therefore, it is possible to suppress the magnetizing inrush current even when opening the circuit breaker or when the magnitude of the AC voltage at the time of applying the voltage changes.

Furthermore, the inrush-current suppressing method according to the first embodiment performs a control of measuring the voltages applied to the three-phase transformer 30 at a first-voltage measuring step, calculating the residual magnetic flux in the reference phase of the transformer using a measurement result of the first-voltage measuring step while assuming the maximum magnetic flux level generated at the time of applying the rated voltage as 1 PU at a residual-magnetic-flux calculating step, calculating the voltages applied by the three-phase AC power supply to the three-phase circuit breaker 1 at a second-voltage measuring step, calculating the stationary magnetic flux in the reference phase of the three-phase transformer 30 using a measurement result of the second-voltage measuring step with reference to the maximum magnetic flux level obtained as 1 PU at the residual-magnetic-flux calculating step at a stationary-magnetic-flux calculating step, and actuating a switch corresponding to the reference phase of the three-phase circuit breaker at the timing when the stationary magnetic flux in the reference phase calculated by the stationary-magnetic-flux calculating unit 52 matches the residual magnetic flux in the reference phase calculated at the residual-magnetic-flux calculating step at a circuit-breaker controlling step. Therefore, it is possible to suppress the magnetizing inrush current even when opening the circuit breaker or when the magnitude of the AC voltage at the time of applying the voltage changes.

Second Embodiment

Figure 5:
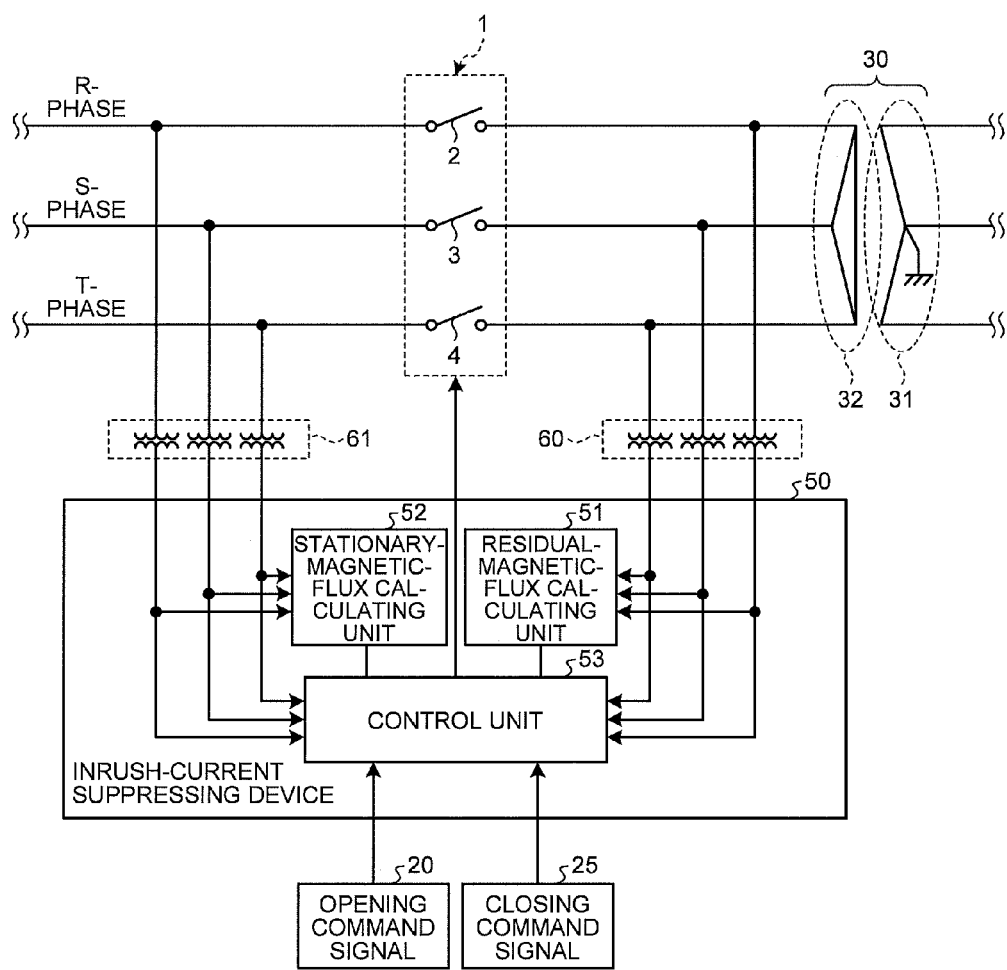
FIG. 5 depicts a configuration of an inrush-current suppressing device according to a second embodiment of the present invention.

FIG. 5 depicts a configuration of an inrush-current suppressing device according to a second embodiment of the present invention. The inrush-current suppressing device according to the second embodiment is applied to a configuration of supplying and shutting off of outputs on a secondary side of the three-phase transformer 30 to which the three-phase AC power is supplied via the three-phase circuit breaker 1. Elements identical to those described in the first embodiment are denoted by like reference signs and explanations thereof will be omitted, and only differences between the first and second embodiments are explained below.

The transformer-voltage measuring unit 60 continuously measures voltage instantaneous values on the output terminals of the three-phase secondary winding 32 of the three-phase transformer 30. These values measured by the transformer-voltage measuring unit 60 are supplied to the residual-magnetic-flux calculating unit 51 and the control unit 53.

The power-supply-voltage measuring unit 61 continuously measures voltages on the output side of the three-phase circuit breaker 1 by the outputs on the secondary side of the three-phase transformer 30. These values measured by the power-supply-voltage measuring unit 61 are supplied to the stationary-magnetic-flux calculating unit 52 and the control unit 53.

As described above, the inrush-current suppressing device 50 according to the second embodiment calculates the stationary magnetic flux in the reference phase of the three-phase transformer 30 with reference to the maximum magnetic flux level obtained as 1 PU based on a measurement result of the transformer-voltage measuring unit 60 that measures the voltages on the output terminals of the three-phase secondary winding 32 of the three-phase transformer 30 and a measurement result of the power-supply-voltage measuring unit 61 that measures the voltages on the output side of the three-phase circuit breaker 1 by the outputs on the secondary side of the three-phase transformer 30. Therefore, similarly to the first embodiment, it is possible to suppress the magnetizing inrush current even when opening the circuit breaker or when the magnitude of the AC voltage at the time of applying the voltage changes.

Third Embodiment

Figure 6:
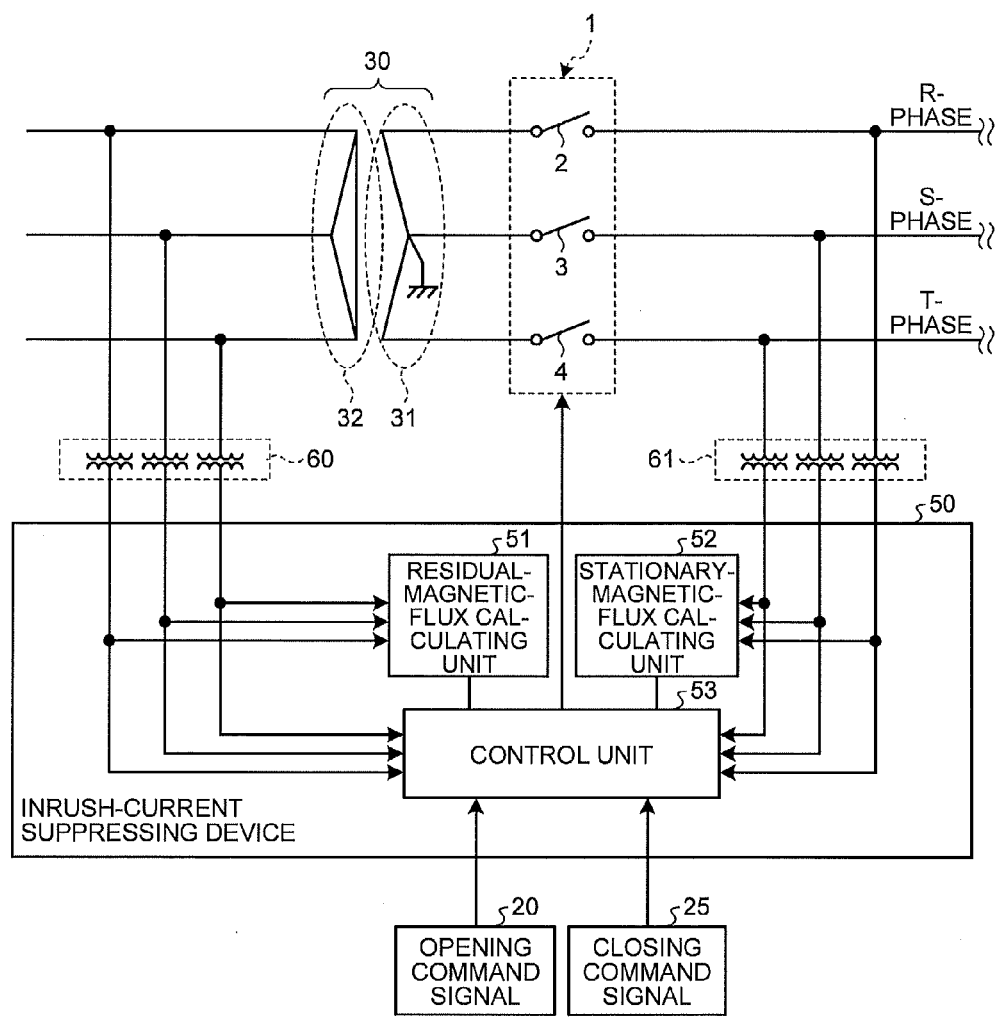
FIG. 6 depicts a configuration of an inrush-current suppressing device according to a third embodiment of the present invention.

FIG. 6 depicts a configuration of an inrush-current suppressing device according to a third embodiment of the present invention. Elements identical to those described in the first embodiment are denoted by like reference signs and explanations thereof will be omitted, and only differences between the first and third embodiments are explained below.

The transformer-voltage measuring unit 60 continuously measures the voltage instantaneous values on the output terminals of the three-phase secondary winding 32 of the three-phase transformer 30. These values measured by the transformer-voltage measuring unit 60 are supplied to the residual-magnetic-flux calculating unit 51 and the control unit 53. Similarly to the first embodiment, the power-supply-voltage measuring unit 61 continuously measures the voltage instantaneous values in the R-phase, the S-phase, and the T-phase of the three-phase AC power supply, that is, the voltages applied by the three-phase AC power supply to the three-phase circuit breaker 1. These values measured by the power-supply-voltage measuring unit 61 are supplied to the stationary-magnetic-flux calculating unit 52 and the control unit 53.

As described above, the inrush-current suppressing device 50 according to the third embodiment calculates the stationary magnetic flux in the reference phase of the three-phase transformer with reference to the maximum magnetic flux level obtained as 1 PU based on the measurement result of the transformer-voltage measuring unit 60 that measures the voltages on the output terminals of the three-phase secondary winding 32 of the three-phase transformer 30 and the measurement result of the power-supply-voltage measuring unit 61 connected to the other end of the three-phase circuit breaker 1. Therefore, similarly to the first embodiment, it is possible to suppress the magnetizing inrush current even when opening the circuit breaker or when the magnitude of the AC voltage at the time of applying the voltage changes.

INDUSTRIAL APPLICABILITY

As described above, the inrush-current suppressing device and the inrush-current suppressing method according to the present invention are useful as an invention that can suppress a magnetizing inrush current without being influenced by the magnitude of the maximum value of an AC voltage.

REFERENCE SIGNS LIST 1 three-phase circuit breaker
2, 3, 4 switch
20 opening command signal
25 closing command signal
30 three-phase transformer
31 three-phase primary winding
32 three-phase secondary winding
50 inrush-current suppressing device
51 residual-magnetic-flux calculating unit
52 stationary-magnetic-flux calculating unit
53 control unit
60 transformer-voltage measuring unit
61 power-supply-voltage measuring unit

The invention claimed is:

1. An inrush-current suppressing device, applied to a configuration of supplying and shutting off a three-phase alternating-current power supply to and from a three-phase transformer via a three-phase circuit breaker, for suppressing a magnetizing inrush current possibly generated in the three-phase transformer during actuation of the three-phase circuit breaker, the device comprising:
   a residual-magnetic-flux calculating unit that calculates a residual magnetic flux in a reference phase of the three-phase transformer while assuming a maximum magnetic flux level generated at a time of applying a rated voltage as 1 PU based on voltages applied to the three-phase transformer before and after opening the three-phase circuit breaker;
   a stationary-magnetic-flux calculating unit that calculates a stationary magnetic flux in the reference phase of the three-phase transformer with reference to the maximum magnetic flux level obtained as the 1 PU based on voltages applied by the three-phase alternating-current power supply to the three-phase circuit breaker, in response to a closing command to the three-phase circuit breaker; and
   a control unit that actuates a switch of the three-phase circuit breaker corresponding to the reference phase at a timing when the stationary magnetic flux in the reference phase calculated by the stationary-magnetic-flux calculating unit matches the residual magnetic flux in the reference phase calculated by the residual-magnetic-flux calculating unit, in response to the closing command.

2. An inrush-current suppressing device, applied to a configuration of supplying and shutting off of outputs on a secondary side of a three-phase transformer via a three-phase circuit breaker, a three-phase alternating-current power supply being supplied to the secondary side of the three-phase transformer, for suppressing a magnetizing inrush current possibly generated in the three-phase transformer during actuation of the three-phase circuit breaker, the device comprising:

a residual-magnetic-flux calculating unit that calculates a residual magnetic flux in a reference phase of the three-phase transformer while assuming a maximum magnetic flux level generated at a time of applying a rated voltage as 1 PU based on voltages generated at the secondary side of the three-phase transformer before and after opening the three-phase circuit breaker;

a stationary-magnetic-flux calculating unit that calculates a stationary magnetic flux in the reference phase of the three-phase transformer with reference to the maximum magnetic flux level obtained as the 1 PU based on voltages on an output side of the three-phase circuit breaker by the outputs on the secondary side of the three-phase transformer, in response to a closing command to the three-phase circuit breaker; and a control unit that actuates a switch of the three-phase circuit breaker corresponding to the reference phase at a timing when the stationary magnetic flux in the reference phase calculated by the stationary-magnetic-flux calculating unit matches the residual magnetic flux in the reference phase calculated by the residual-magnetic-flux calculating unit, in response to the closing command.

3. An inrush-current suppressing device, applied to a configuration of supplying and shutting off a three-phase alternating-current power supply to and from a three-phase transformer via a three-phase circuit breaker, for suppressing a magnetizing inrush current possibly generated in the three-phase transformer during actuation of the three-phase circuit breaker, the device comprising:

a residual-magnetic-flux calculating unit that calculates a residual magnetic flux in a reference phase of the three-phase transformer while assuming a maximum magnetic flux level generated at a time of applying a rated voltage as 1 PU based on voltages generated at a secondary side of the three-phase transformer before and after opening the three-phase circuit breaker;

a stationary-magnetic-flux calculating unit that calculates a stationary magnetic flux in the reference phase of the three-phase transformer with reference to the maximum magnetic flux level obtained as the 1 PU based on voltages applied by the three-phase alternating-current power supply to the three-phase circuit breaker, in response to a closing command to the three-phase circuit breaker; and a control unit that actuates a switch of the three-phase circuit breaker corresponding to the reference phase at a timing when the stationary magnetic flux in the reference phase calculated by the stationary-magnetic-flux calculating unit matches the residual magnetic flux in the reference phase calculated by the residual-magnetic-flux calculating unit, in response to the closing command.

4. An inrush-current suppressing method, applied to a configuration of supplying and shutting off a three-phase alternating-current power supply to and from a three-phase transformer via a three-phase circuit breaker, for suppressing a magnetizing inrush current possibly generated in the three-phase transformer during actuation of the three-phase circuit breaker, the method comprising:

a first-voltage measuring step of measuring voltages applied to the three-phase transformer;

a residual-magnetic-flux calculating step of calculating a residual magnetic flux in a reference phase of a primary side of the three-phase transformer while assuming a maximum magnetic flux level generated at a time of applying a rated voltage as 1 PU based on a measurement result of the first-voltage measuring step before and after opening the three-phase circuit breaker;

a second-voltage measuring step of measuring voltages applied to the three-phase circuit breaker by the three-phase alternating-current power supply;

a stationary-magnetic-flux calculating step of calculating a stationary magnetic flux in the reference phase of the three-phase transformer with reference to the maximum magnetic flux level obtained as the 1 PU based on a measurement result of the second-voltage measuring step, in response to a closing command to the three-phase circuit breaker; and a circuit-breaker controlling step of actuating a switch of the three-phase circuit breaker corresponding to the reference phase at a timing when the stationary magnetic flux in the reference phase calculated at the stationary-magnetic-flux calculating step matches the residual magnetic flux in the reference phase calculated at the residual-magnetic-flux calculating step, in response to the closing command.

5. An inrush-current suppressing method, applied to a configuration of supplying and shutting off of outputs on a secondary side of a three-phase transformer via a three-phase circuit breaker, a three-phase alternating-current power supply being supplied to the secondary side of the three-phase transformer, for suppressing a magnetizing inrush current possibly generated in the three-phase transformer during actuation of the three-phase circuit breaker, the method comprising:

a first-voltage measuring step of measuring voltages generated at the secondary side of the three-phase transformer before and after opening the three-phase circuit breaker;

a residual-magnetic-flux calculating step of calculating a residual magnetic flux in a reference phase on the secondary side of the three-phase transformer while assuming a maximum magnetic flux level generated at a time of applying a rated voltage as 1 PU, based on a measurement result of the first-voltage measuring step before and after opening the three-phase circuit breaker;

a second-voltage measuring step of measuring voltages on an output side of the three-phase circuit breaker by the outputs on the secondary side of the three-phase transformer;

a stationary-magnetic-flux calculating step of calculating a stationary magnetic flux in the reference phase of the three-phase transformer with reference to the maximum magnetic flux level obtained as the 1 PU based on a measurement result of the second-voltage measuring step, in response to a closing command to the three-phase circuit breaker; and a circuit-breaker controlling step of actuating a switch of the three-phase circuit breaker corresponding to the reference phase at a timing when the stationary magnetic flux in the reference phase calculated at the stationary-magnetic-flux calculating step matches the residual magnetic flux in the reference phase calculated at the residual-magnetic-flux calculating step, in response to the closing command.

6. An inrush-current suppressing method, applied to a configuration of supplying and shutting off a three-phase alternating-current power supply to and from a three-phase transformer via a three-phase circuit breaker, for suppressing a magnetizing inrush current possibly generated in the three-phase transformer during actuation of the three-phase circuit breaker, the method comprising:
- a first-voltage measuring step of measuring voltages generated at a secondary side of the three-phase transformer before and after opening the three-phase circuit breaker;
- a residual-magnetic-flux calculating step of calculating a residual magnetic flux in a reference phase of the secondary side of the three-phase transformer while assuming a maximum magnetic flux level generated at a time of applying a rated voltage as 1 PU, based on a measurement result of the first-voltage measuring step before and after opening the three-phase circuit breaker;
- a second-voltage measuring step of measuring voltages applied by the three-phase alternating-current power supply to the three-phase circuit breaker;
- a stationary-magnetic-flux calculating step of calculating a stationary magnetic flux in the reference phase of the three-phase transformer with reference to the maximum magnetic flux level obtained as the 1 PU based on a measurement result of the second-voltage measuring step, in response to a closing command to the three-phase circuit breaker; and
- a circuit-breaker controlling step of actuating a switch of the three-phase circuit breaker corresponding to the reference phase at a timing when the stationary magnetic flux in the reference phase calculated at the stationary-magnetic-flux calculating step matches the residual magnetic flux in the reference phase calculated at the residual-magnetic-flux calculating step, in response to the closing command.

* * * * *